3,215,595
HALO-, ALKYL- AND ALKENYL-PHENYL-N-ALKYL-CARBAMATES AS FUNGICIDES
Ernst Böcker, Leverkusen, Rudolf Heiss, Cologne-Stammheim, and Paul-Ernst Frohberger, Dusseldorf, Germany, assignors to Farbenfabrieken Bayer Aktiengesellschaft, Leverkusen, Germany, a corporation of Germany
No Drawing. Filed Oct. 22, 1964, Ser. No. 405,835
Claims priority, application Germany, Nov. 29, 1963, F 41,421
8 Claims. (Cl. 167—30)

The present invention concerns the use of phenyl-N-alkyl-carbamates, some of which are known, as fungitoxic agents.

It has not hitherto been disclosed that representatives from the class of the carbamates exhibit fungicidal properties.

It is an object of the present invention to provide fungitoxic agents, only some of the chemical substance contained therein being previously known. A further object of the present application relates to the development of chemical processes suitable for the production of the active agents which were not previously known. Other objects are evident from the following description including the Examples.

It has been found that a class of phenyl-N-alkyl-carbamates of the formula

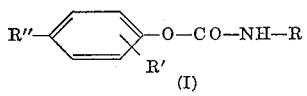

wherein
R denotes alkyl with 1 to 4 carbon atoms,
R′ denotes alkyl with 1 to 4 carbon atoms or alkenyl with 2 to 4 carbon atoms, and
R″ denotes hydrogen, methyl or halogen, some of which are known, exhibit strong fungitoxic properties.

It must be regarded as definitely surprising that the phenyl-N-alkyl-carbamates to be employed according to the invention should exhibit such properties, since hitherto no compounds of similar structure have been known to possess such utility.

The compounds to be employed according to the invention are characterised by the above Formula I. In this formula, R preferably represents methyl, R′ preferably represents a secondary alkyl group with 1 to 4 carbon atoms and R″ preferably represents chlorine, bromine and fluorine in addition to hydrogen and methyl.

The following may be mentioned in detail as examples of the compounds included within the present invention:

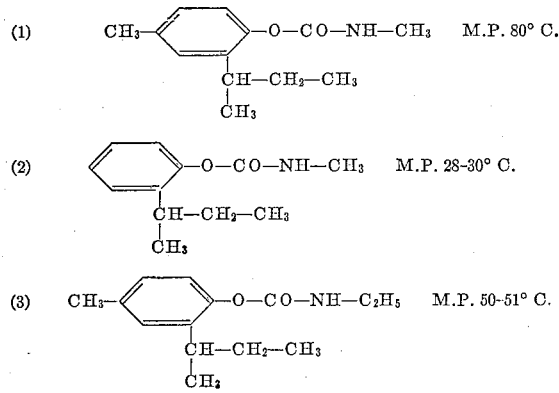

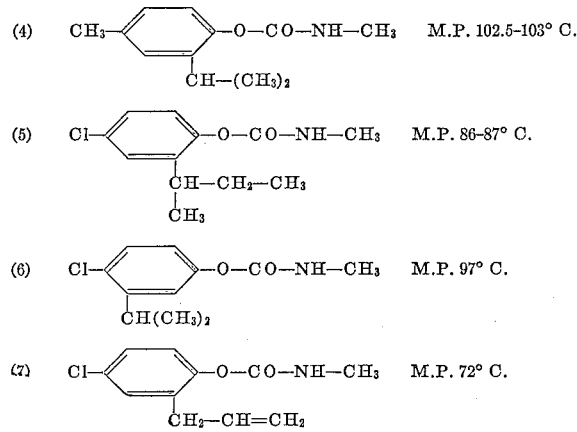

Several of the compounds to be employed in accordance with the invention are novel. They can be prepared according to methods known per se, by (a) Reacting the corresponding phenols with the respective isocyanates, when it is convenient to operate in the presence of organic solvents and within a temperature range of —50 to +150° C.;

(b) Converting the corresponding phenols with phosgene to the respective chloroformic acid esters at a pH value of less than 6 during a first stage, when it is convenient to operate in aqueous or alcoholic solvents within a temperature range between —50 and +50° C., and reacting the resultant chloroformic acid esters with the appropriate amines during a second stage, when it is convenient to operate in the presence of inert organic solvents within a temperature range of about —20 to +100° C.; or (c) Converting the corresponding phenols with phosgene to the respective bis-(phenyl)-carbonates at pH values between 6 and 9 during a first stage, when it is convenient to operate in the presence of organic solvents with the addition of sodium hydroxide solution at temperatures between 0 and 100° C., and reacting the resultant bis-(phenyl)-carbonates with the appropriate amines during a second stage to form the required phenyl N-alkyl-carbamates, when it is convenient to operate in the presence of inert organic solvents at temperatures between —50 and +150° C.

The compounds according to the invention exhibit a high fungitoxic potential which is directed against different species of fungi. Their low toxicity towards warm-blooded creatures makes possible their application for the control of undesirable fungus growth. In addition, their good compatability with phanerogames makes possible their practical application as plant protection agents against plant diseases caused by fungi. They may for instance be employed as soil treatment agents or as seed dressings.

The compounds according to the invention may be converted to the usual compositions, such as emulsifiable concentrates, spray powders, pastes, soluble powders, dusting agents and granulates. These are prepared in known manner (cf. Agricultural Chemicals, March 1960, pages 35–38). The following may be mainly considered as assistants for this purpose: solvents such as aromatic hydrocarbons (for instance xylene, benzene), chlorinated aromatic hydrocarbons (for instance chlorobenzenes), paraffins (for instance petroleum fractions), alcohols (for instance methanol, butanol), amines (for instance ethanolamine, dimethylformamide) and water; carriers such as natural ground minerals (for instance kaolines, aluminas, talc, chalk) and synthetic ground minerals (for instance highly dispersed silicic acid, silicates); emulsifying agents such as non-ionic and anionic emulsifying agents (for instance polyethylene oxide esters of fatty acids polyethylene oxide ethers of fat alcohols, alkyl sulphonates and aryl sulphonates); and dispersing agents such as lignin, spent sulphite liquors and methylcellulose.

The active agents according to the invention may be present in the compositions in the form of mixtures with other known active agents, such as fungicides, insecticides, nematicides, herbicides, and bactericides, as well as cultivation assistants such as fertilisers and soil structure improving agents.

In general, the compositions contain between 0.1 and 95 percent by weight of the active agent, and preferably between 0.5 and 90 percent by weight.

The compositions of the substances to be employed according to the invention are applied by the usual methods, for instance by atomising, sprinkling, fumigating, spraying, dispersing, dusting, watering, or injecting, or by the dry, moist, wet or slime dressing processes.

The following examples are given for the purpose of illustrating the invention.

EXAMPLE 1

Test as soil treatment agent against the phytopathogenic soil fungi *Rhizoctonia solani, Verticillium alboatrum* and *Thielaviopsis basicola*.

The products are first ground in a mortar with 20 times their weight of fine grained talc, homogeneously mixed and thereafter further extended with quartz sand to a 0.5% content of the active agent. The products are uniformly mixed with the cultivation soil in this form. The cultivation soil consists of Fruhstorf standard soil, which is thermally sterilised and then inoculated with a pure culture of the specified fungi. It is filled into cardboard pots immediately after inoculation and treatment of the soil, and in the case of Rhizoctonia and Verticillum pea seeds are sown therein, whilst in the case of Thielaviopsis cotton seeds are sown therein. For the sake of comparison, a part of the soil is also left uninoculated and without added compositions after sterilisation, whilst another part is inoculated but not treated with the compositions. For each part of the experiments, 5 x 10 seeds are placed into 5 pots. A count is taken of the healthy plants three weeks after sowing. The following table specifies their number as a percentage of the inserted seeds.

TABLE

| Part of experiment | Product applied—amount of active agent, as mg./litre of soil | Number of healthy plants, as a percentage, 3 weeks after sowing | | |
|---|---|---|---|---|
| | | Rhizoctonia solani | Verticillium alboatrum | Thielaviopsis basicola |
| Fruhstorf standard soil, sterilised: | | | | |
| (A) untreated | | 90 | 96 | 92 |
| Fruhstorf standard soil, sterilised, and inoculated: | | | | |
| (B) untreated | | 0 | 4 | 18 |
| (C) 1 | 25 | | 62 | |
| | 100 | 56 | 72 | 64 |
| | 200 | 84 | | |
| (D) 2 | 100 | 44 | | |
| | 200 | 90 | | |
| (E) 3 | 100 | 50 | | |
| | 200 | 76 | | |
| (F) 4 | 100 | 40 | | |
| | 200 | 76 | | |
| (G) 5 | 100 | 35 | | |
| (H) 6 | 100 | 40 | | |
| (I) 7 | 100 | 35 | | |

EXAMPLE 2

Test as seed dressing against *Rhizoctonia solani* (living in the soil) and *Tilletia tritici* (living on seeds): The products are ground in a mortar with fine grained talc and homogeneously mixed so that dry seed dressings with good adhesive powers are formed at the stated concentrations of the active agent.

(a) Marrow peas are dressed by the usual method of shaking in glass bottles for 3 minutes with 2 g. of a dry seed dressing per kg. of seed material, the dressing containing 50% of Compound 1. These peas are sown in thermally sterilised Fruhstorf standard soil at a rate of 5 x 10 grains, after the soil has been inoculated with pure cultures of *Rhizoctonia solani*. Undressed seed material was also sown into such soil, which had not been inoculated, for the sake of comparison. A count is taken of the healthy plants three weeks after sowing. The following results were obtained during the execution of this experiment:

Whereas 86 healthy plants emerged from non-inoculated soil from 100 peas, only 36 plants emerged from inoculated soil when untreated seed material was used. On the other hand, 74 healthy plants emerged from the same soil when dressed seed material was used.

(b) Wheat seed material which had been contaminated with 5 g. of spores of wheat bunt (*Tilletia tritici*) is dressed by the usual method by shaking in glass bottles for 3 minutes with 1 g. of a dry seed dressing per kg. of seed material, the dressing containing 10% of Compound 1. Dressed and undressed wheat grains are exposed at 10° C. in a refrigerator for 10 days to optimum germination conditions for the spores on moist loam under a protective bed consisting of a layer of humus and 2 cm. of compost soil. The following results were obtained during the execution of this experiment:

Whereas practically all of the approximately 100,000 spores present on each wheat grain were found to have germinated on the undressed seed material so as to provide the conditions for an infection of the wheat seedlings, the germination of all the spores present was prevented on the dressed wheat grains. The investigation was carried out under a microscope.

EXAMPLE 3

2-sec.butyl-4-methylphenyl-N-methyl-carbamate (1)

16.5 g. of 2-sec.butyl-4-methylphenol are stirred in 6 ml. of anhydrous dioxane with 6.3 g. of methylisocyanate and caused to react with 2 drops of triethylamine when the solution becomes hot. After cooling, the reaction mixture is treated with about 25 ml. of water, when the colourless carbamate is precipitated. It is filtered off and dried. Yield: 17.2 g. It melts at 80° C. after recrystallisation from ligroin. The above mentioned Compounds 4, 5, 6 and 7 can also be prepared when the appropriate compounds are reacted by an entirely analogous method.

EXAMPLE 4

2-sec.butyl-4-methylphenyl-N-ethyl-carbamate (3)

(a) PREPARATION OF THE CHLOROFORMIC ACID ESTER 650 g. of phosgene are condensed in a cold trap and poured into a solution of 656 g. of 2-sec.butyl-4-methylphenol in 1.5 litres of toluene cooled in a mixture of ice and sodium chloride. The reaction mixture is gradually neutralised with a total of about 550 ml. of 45% sodium hydroxide solution, at a sufficiently slow rate for the temperature of the reaction mixture not to rise above 0° C. The pH value of the mixture at first remains in the strongly acidic range. Later, it rises gradually. The rate of addition of the sodium hydroxide solution then has to be cut down so that the pH value does not exceed 7. The reaction has been completed after several hours, when the pH value has remained at 7 for about 3 minutes. The mixture is filtered off with suction when some greasy substance remains behind. The aqueous layer is separated. The organic layer is washed with a solution of sodium hydrogen carbonate, dried over sodium sulphate and freed from toluene in vacuo at 12 mm. Hg. The residue is distilled at 78° C. and 0.8 mm. Hg.

Yield: 730 g. The product was 84% pure according to an analysis for its chlorine content.

(b) PREPARATION OF THE CARBAMIC ACID ESTER

A solution of 45.4 g. of the chloroformic acid ester (0.2 mole) in 30 ml. of benzene is added dropwise to a solution of 18 g. of pure ethylamine (0.42 mole) in 50 ml. of water. The temperature of the reaction mixture is kept at less than 20° C. by means of small pieces of ice. The organic phase is separated, dried and stirred with petroleum ether. The carbamate is precipitated on cooling. It is filtered off with suction and dried, yielding 39 g. It melts at 49–51° C. after recrystallisation from ligroin.

We claim:

1. A method for controlling fungi, which comprises applying to said fungi an effective amount of a compound of the formula

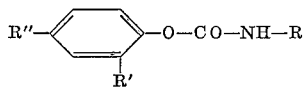

wherein
R is alkyl of 1–4 carbon atoms;
R' is a member selected from the group consisting of alkyl of 1–4 carbon atoms and alkenyl of 2–4 carbon atoms, and
R" is a member selected from the group consisting of hydrogen, methyl and halogen.

2. A method for controlling fungi, which comprises applying to said fungi an effective amount of a compound of the formula

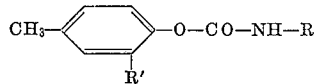

wherein
R is alkyl of 1–4 carbon atoms; and
R' is alkyl of 1–4 carbon atoms.

3. A method for controlling fungi, which comprises applying to said fungi an effective amount of a compound of the formula

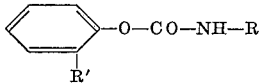

wherein
R is alkyl of 1–4 carbon atoms; and
R' is alkyl of 1–4 carbon atoms.

4. A method for controlling fungi, which comprises applying to said fungi an effective amount of a compound of the formula

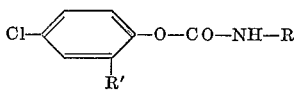

wherein
R is for alkyl of 1–4 carbon atoms; and
R' is for alkyl of 1–4 carbon atoms.

5. A method for controlling fungi, which comprises applying to said fungi an effective amount of a compound of the formula

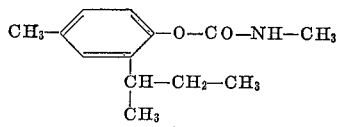

6. A method for controlling fungi, which comprises applying to said fungi an effective amount of a compound of the formula

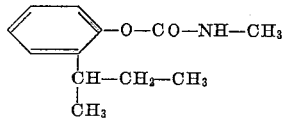

7. A method for controlling fungi, which comprises applying to said fungi an effective amount of a compound of the formula

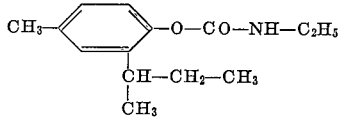

8. A method for controlling fungi, which comprises applying to said fungi an effective amount of a compound of the formula

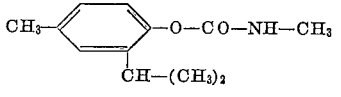

No references cited.

JULIAN S. LEVITT, *Primary Examiner.*